United States Patent

[11] 3,617,034

[72] Inventor Davis A. Skinner
   Fullerton, Calif.
[21] Appl. No. 14,103
[22] Filed Feb. 25, 1970
[45] Patented Nov. 2, 1971
[73] Assignee Union Oil Company of California
   Los Angeles, Calif.

[54] INTERNAL COMBUSTION ENGINE FUEL SYSTEM MINIMIZING EVAPORATIVE FUEL LOSSES
6 Claims, 3 Drawing Figs.

[52] U.S. Cl. ........................................ 261/22,
   261/72 R, 123/136, 220/85 VS, 220/85 VR,
   220/85 B
[51] Int. Cl. ...................................... B65d 25/38
[50] Field of Search .......................... 123/136;
   220/85 VS, 85 VR, 85 B; 261/72 R, 22

[56] References Cited
UNITED STATES PATENTS
2,432,025 12/1947 Lorenz .......................... 220/85 B
2,916,058 12/1959 Unthank ........................ 220/85 B
3,477,611 11/1969 Niles ............................. 220/85 B
3,518,977 7/1970 Smith ............................ 123/136
3,540,423 11/1970 Tolles ........................... 123/136
3,542,239 11/1970 Latvala et al. ................ 220/85 VR FOREIGN PATENTS
1,018,411 1/1966 Great Britain ................ 220/85 B OTHER REFERENCES
Hansen, Def. Pub. of Ser. No. 775,389, pub. 861 O.G. 19, filed 11-13-1968 123- 136.

Primary Examiner—Tim R. Miles
Attorneys—Milton W. Lee, Richard C. Hartmann, Lannas S. Henderson, Dean Sandford, Robert E. Strauss, Michael H. Laird and Elgin C. Edwards ABSTRACT: Fuel losses and accompanying air pollution are lessened by equipping an internal combustion engine with a fuel tank having a collapsible liquid fuel compartment and means for withdrawing any fuel vapors which form and combusting them in the engine.

PATENTED NOV 2 1971　　3,617,034

INVENTOR.
DAVIS A. SKINNER
BY Elgin Edwards
ATTORNEY 3,617,034

INTERNAL COMBUSTION ENGINE FUEL SYSTEM MINIMIZING EVAPORATIVE FUEL LOSSES

BACKGROUND OF THE INVENTION

This invention relates to improved fuel storage and delivery systems for internal combustion engines. More particularly, it relates to systems for minimizing the loss of gasoline from automobile fuel tanks.

It is well known that the operation of motor vehicles makes a significant contribution to the air pollution problem in urban areas. The motor vehicles not only release substantial quantities of unburned hydrocarbon into the atmosphere by failure of the engine to completely combust all of the fuel, but their use also results in significant quantities of fuel evaporating into the atmosphere from the vehicles' fuel supply systems. For example, it is known that a significant and substantial amount of gasoline evaporates from both the carburetor and fuel tank of motor vehicles. This occurs both during operation of the engine and after the engine stops. Efforts to control evaporation from carburetors have been generally more successful than have efforts to control the evaporation of gasoline from the fuel tank itself.

The fuel tank of a modern, internal combustion engine powered motor vehicle is not ordinarily designed to minimize fuel evaporation. For example, most tanks are subject to reaching relatively high temperatures during the operation of the motor vehicle due to their proximity to the hot exhaust pipe of the vehicle and also due to the passage of hot air from the engine past the gas tank. Radiant heat from the roadway also contributes to heating the tanks. The heated gasoline generates a substantial amount of vapor in the gas tank and builds up sufficient pressure to leak from the gas filler lines and any other openings in the tank. Furthermore, when a partially empty tank is filled with gasoline, e.g., at a service station, the incoming liquid gasoline displaces any vapors which are present in the vapor space of the tank. Vapors exit directly from the filler spout of the tank into the atmosphere, thus contributing a substantial amount of hydrocarbons to the air.

Attempts have been made to minimize the generation of gasoline vapors by insulating gasoline tanks; however, these have not been particularly successful since even at atmospheric conditions substantial amounts of vapors are produced. More recently, efforts have been made to capture the hydrocarbon vapors using an absorbent, e.g., activated charcoal. However, when a gasoline tank is filled, the vapors are displaced so rapidly as to require a large quantity of absorbent and large delivery lines to the absorbent to handle the suddenly displaced volume of vapors. Moreover, a large fraction of vapors leaks out via the filler spout, i.e., around the pump dispenser nozzle at the service station.

Accordingly, it is an object of this invention to provide an improved system for the abatement of atmospheric pollution resulting from the operation of internal combustion engines.

Another object is to provide a system for reducing the gross fuel consumption of automobiles thus resulting in more efficient and economical operation.

A further object is to reduce substantially the evaporative fuel losses from the fuel supply and delivery system of internal combustion engines, especially fuel tanks of automobiles.

SUMMARY OF THE INVENTION

It has now been found that the foregoing and other objects can be achieved in accordance with the present invention which contemplates in combination with an internal combustion engine, a tank for volatile liquid fuel having an impervious flexible medium capable of collapsing, settling upon, or otherwise closing around the volatile liquid fuel to minimize the formation of vapor spaces in the tank as the fuel is consumed, and a means for withdrawing any fuel vapors which may form above the liquid fuel and combusting the vapors in the internal combustion engine.

BRIEF DESCRIPTION OF THE DRAWINGS

The invention will be better understood by reference to the drawings in which.

DETAILED DESCRIPTION OF THE INVENTION

Figure 1:
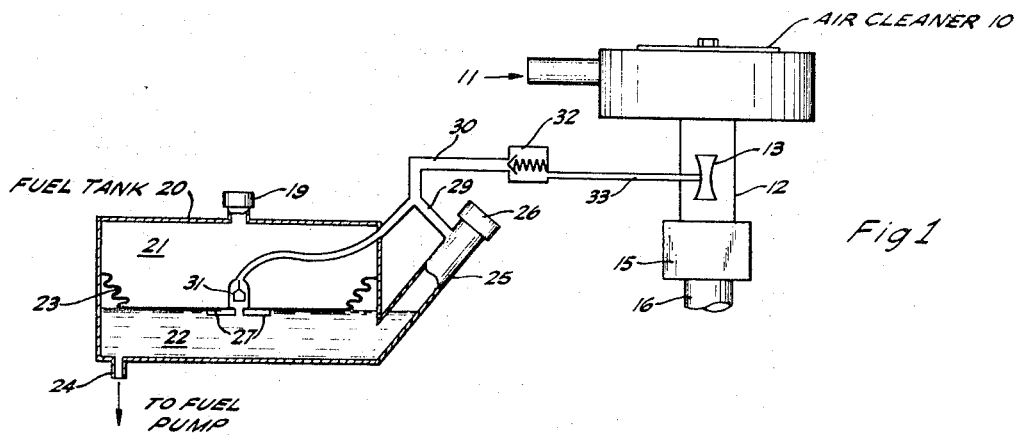
FIG. 1 is a schematic drawing of a fuel tank, carburetor and air feed system designed in accordance with the present invention.

Referring now particularly to FIG. 1, the drawing therein shows a fuel tank 20, an air intake system including an air cleaner 10, and a carburetor 15 for delivery of fuel and air to an internal combustion engine (not shown). The air intake and carburetor system includes an air inlet 11 for drawing atmospheric air into the air cleaner 10 prior to passage through conduit 12 to the carburetor 15 and line 16 to the intake manifold of an internal combustion engine. Within conduit 12 there is positioned a venturi 13 through which part or all of the incoming air from the air cleaner 10 is passed.

The fuel tank 20 has an air vent 19 which is open to the atmosphere and a flexible diaphragm 23 which divides the rigid tank shell 29 into an air compartment or space 21 and a fuel space 22. The flexible medium 23 may consist of a bellows-shaped diaphragm prepared from metallic or nonmetallic materials. Preferably however, the diaphragm is composed of a polymeric flexible material such as hydrocarbon resistant, impervious plastics, elastomers, and the like. For example, nylon film has been successfully used. Even more impervious however is a sandwich of layered sheet material formed from a layer of nylon covered on both sides by layers of acrylonitrile. Such materials are well known and have been used, e.g., for lining aircraft engines' gas tanks. Even more preferable, is film composed of polyethylene terephthalate resin which is a highly durable transparent water repellent impervious film. (Such material is sold commercially under the trade name Mylar by E. I. DuPont de Nemours and Company.)

The polymeric diaphragm 23 can be any thickness sufficient to provide adequate strength without being unduly inflexible. The diaphragm design is not critical, and it is not intended that the invention be limited to any particular material or design. Different thicknesses will be desirable for different types of materials depending upon their particular strength and flexibility and permeability characteristics. However, in general it is desirable to use the flexible mediums in thicknesses ranging about 0.05 to 0.5 inch. The diaphragm 23 is preferably equipped with a floating material 27 which may be air tanks, surface-sealed foam plastic, e.g., as used in life preservers and floats, or any other lightweight material with sufficient buoyancy to insure that the flexible diaphragm is held in a position to form a pocket for any vapors which may be formed. Preferably the buoyant material 27 is located generally in the center of diaphragm 23 to hold it slightly above the surrounding area so that any generated vapors tend to migrate into the pocket. Above the floating material the flexible diaphragm 23 is perforated and connected to a conduit 30, a flexible tubing which contains a floating check valve 31 for preventing any liquid from entering the main body of flexible tubing 30.

Flexible tubing 30 is connected to fill spout 25 by line 29 and to a controlled-bleed valve 32 which opens at a predetermined differential pressure across the valve. The outlet of the control-bleed valve 32 is connected to line 33 which extends into the venturi 13 in the air inlet system.

In operation, fuel tank 20 is filled by removing cap 26 and adding fuel through fill spout or inlet line 25. It may be desirable to include a slip ring, e.g., composed of rubber such as neoprene or plastic sized to essentially seal around a filling nozzle inserted into the filling spout 25. The tank is filled to a desired level which causes the flexible diaphragm 23 to rise toward the top of the tank, displacing air from air space 21 out vent 19 to the atmosphere. Thus, there is little or no space between diaphragm 23 and the liquid contents of the fuel space 22. Accordingly, there is little or no generation of fuel vapors.

When the internal combustion engine (not shown) is operated, fuel is drawn from outlet 24 to a fuel pump or other means for feeding fuel to the engine. As the fuel is consumed, the level of fuel in tank 20 drops and the flexible diaphragm 23 follows the fuel level down, staying in close proximity or on the surface of the liquid fuel, thus maintaining the vapor space at a minimum.

As the level drops, atmospheric air is drawn in through vent 19 to fill air space 21. To insure that the flexible diaphragm follows the liquid fuel down in the tank, it is desirable to generate a partial vacuum above the fuel, i.e., between the diaphragm 23 and the liquid fuel in space 22. This partial vacuum is generated by drawing any generated fuel vapors through lines 30 and 29 and conveying the vapors through bleed valve 32 and line 33 into venturi 13 and air inlet line 12.

However, it is undesirable to draw the vapors into the incoming air which is fed to the internal combustion engine unless the engine is operating under conditions such that the additional hydrocarbon vapors do not adversely affect engine performance or increase the concentration of unburned hydrocarbons in the engine exhaust. For example, at low engine speed, e.g., idling, the additional hydrocarbons in the incoming air may be sufficient to cause very rough performance of the engine. Accordingly, it is desirable to prevent any significant vapor flow into the air when the engine is operating at low speeds. This is achieved with the venturi and control-bleed valve arrangement by setting the control-bleed valve 32 to open only when a predetermined but relatively high pressure drop between the atmospheric pressure of tank 20 and the lower pressure in venturi 13 is attained. Thus, when the engine is idling, there is only a small amount of air drawn in through inlet 11 and air cleaner 10. This produces low air velocities through venturi 13 which generate only slight vacuums in line 33. Thus the vacuums generated will be too slight to open the biased bleed valve 32, and no vapors will be drawn from the fuel space 22 of fuel tank 20. However, when the engine reaches a sufficiently high speed, e.g., cruising speeds for automobiles, preferably above about 30 miles per hour, relatively large quantities of air are drawn at high velocities through venturi 13 which then generates sufficiently high vacuums to increase the pressure drop across bleed valve 32 to open the valve and draw vapors through line 30 from above the fuel in fuel space 22 and fill spout 29.

Thus, in using the unique control-bleed system of this invention, the vapors are drawn from the tank only when engine operation is such that no adverse effects on its performance result. Accordingly, there is maintained in the fuel space 22 of tank 20 little or no fuel vapors. This is particularly advantageous when the tank is filled since there will be little or no displacement of vapors out of the tank by the incoming liquid feed, and no build up of vapors to leak out of the tank. The advantages of the system in combatting air pollution, by minimizing the contributions of fuel tank evaporation losses, are apparent.

Figure 2:
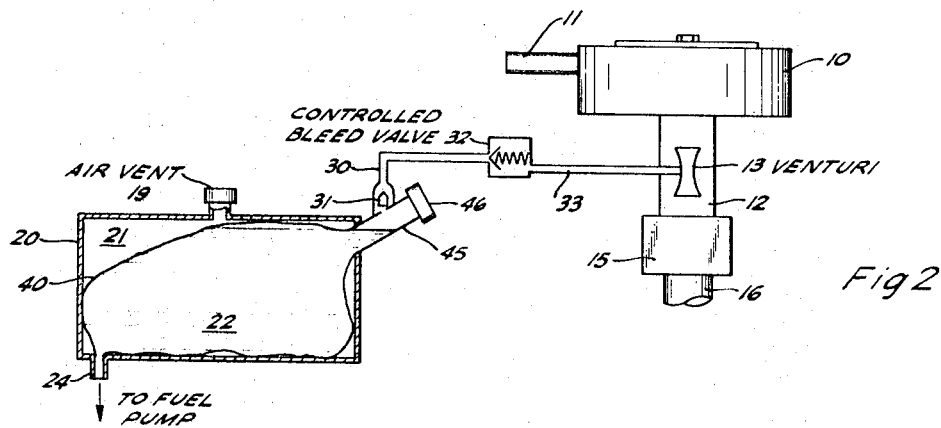
FIG. 2 is a more preferred embodiment of a fuel tank designed in accordance with this invention employing a collapsible bag to contain the volatile liquid fuel.

Turning now to FIG. 2 therein is shown a modified version of the apparatus in FIG. 1 wherein a particularly preferred form of fuel tank is used. In this tank, the fuel, e.g., gasoline, is enclosed completely in a flexible bag 40 composed of a polymeric flexible material, e.g., as discussed above in connection with the apparatus of FIG. 1.

In the operation of the system shown in FIG. 2, gasoline or other volatile liquid hydrocarbon fuel is added to tank 20 by removing cap 46 and injecting fuel into inlet line or fill spout 45 to fill flexible bag 40, which separates air space 21 from the fuel space 22 of tank 20. As the bag fills, air in space 21 is driven out vent 19 to the atmosphere. Conversely, when the bag empties by drawing fuel from outlet 24 to a fuel pump for feeding an internal combustion engine (not shown), air is drawn from the atmosphere through vent 19 into air space 21 around the bag 40. The bag thus collapses and remains in close proximity to the liquid fuel in fuel space 22. As with the diaphragm of FIG. 1, the bag collapses around the fuel, minimizing the volume of vapor space above the liquid fuel. This in turn minimizes the amount of vapors which are available to escape into the atmosphere when gas cap 46 is removed for filling the tank.

To insure that bag 40 continuously collapses as the fuel in fuel space 22 is used, it is desirable to generate a partial vacuum within the bag in the vapor space. This is accomplished in the same manner as described in connection with the operation of the system shown in FIG. 1 above. Thus, bleed valve 32 opens when the engine speed is sufficient to draw a sufficient amount of air through venturi 13 to generate the required partial vacuum.

To prevent splashing or sloshing of liquid fuel into line 30 a float check valve 31 is positioned at the entrance to line 30 from the filler spout 45 of the gas tank 20. Thus, if liquid attempts to rise into line 30, the float valve seats and prevents any flow of liquid therethrough.

Figure 3:
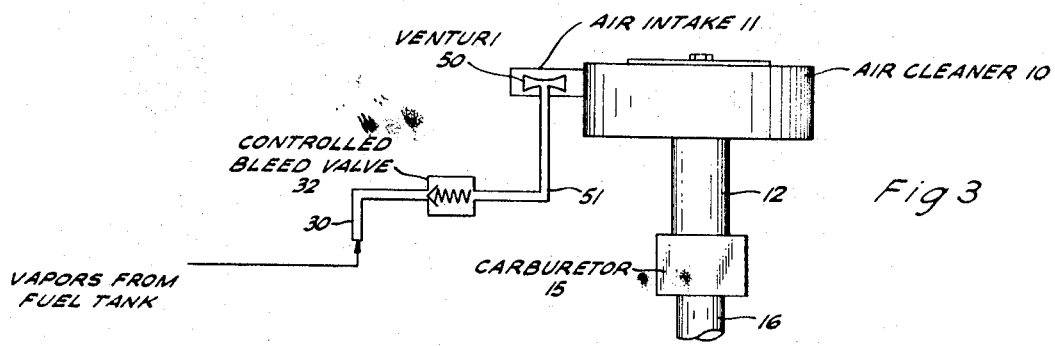
FIG. 3 shows an alternative to the arrangement of FIGS. 1 and 2 for withdrawing vapors from fuel tanks and conveying them to carburetors for subsequent combustion in the internal combustion engine.

FIG. 3 illustrates an alternative position for the venturi to generate the partial vacuum required to draw vapors from the fuel tank in accordance with this invention. In the FIG., there is shown venturi 50 positioned within the air intake line 11 ahead of air cleaner 10, air conduit 12 and carburetor 15 which leads via outlet line 16 to the internal combustion engine (not shown). The operation of the venturi 50 is essentially identical to that described for venturi 13 in FIGS. 1 and 2. The passage of air through venturi 50 draws vapors from the fuel tank through line 30, bleed valve 32 and line 51 into the air stream which is to be combusted in the internal combustion engine. A notable advantage of placing the venturi in the position shown in FIG. 3, is that it is easily adapted to any existing air intake systems without change in the basic carburetor or air cleaner system designs.

While the preferred modes presently contemplated for using applicant's invention has been described in terms of specific equipment, it will be apparent that many alternative variations will be within the scope of the invention. Thus for example, control of the bleed valve 32 in the drawings can be achieved using any conventional valve forms. For example, a pressure control valve operated by the back pressure on the exhaust manifold of the internal combustion engine could also be used to open and close the valve. Similarly, any other mode of generating a partial vacuum in the air intake system, e.g., through orifices, blowers or other apparatus designed to generate pressure drops, could be used as long as provisions are made for feeding the fuel vapors into the carburetor air only at times when engine performance or pollutant concentrations in the exhaust gas will not be adversely affected. Moreover, the invention is not intended to be limited to any specific types of materials for use in the flexible mediums, floats, tank shells and the like, since many alternative materials could clearly be used while remaining within the spirit and scope of the present invention.

I claim:
1. In combination with an internal combustion engine, an improved volatile liquid fuel storage and delivery system adapted to minimize evaporative fuel losses, comprising:

a remote storage tank for volatile liquid fuel comprising a rigid shell, an impervious flexible medium dividing the shell into an air space and a fuel space, said air space being vented to the atmosphere and said flexible medium being adapted to adjust the volume of said fuel space to be substantially the same as the volume of the liquid fuel contained therein, whereby when volatile liquid fuel is stored in the tank, said fuel space is filled principally with liquid and contains only a minor portion of fuel vapors above said liquid fuel;

air induction means adapted to generate a partial vacuum to draw air from the atmosphere and to convey said air into said internal combustion engine for combustion therein, the magnitude of said partial vacuum increasing with the volume of air conveyed through said induction means; and conduit means in fluid communication between said air induction means and the fuel vapors above said volatile liquid fuel adapted for passage of said vapors from said fuel tank to said air induction means, whereby said vapors are drawn from the tank for conveying with said air into the internal combustion engine and a partial vacuum is generated in said fuel space thereby drawing and maintaining said flexible medium in close association with the liquid fuel in said tank.

2. The combination of claim 1 wherein said air induction means comprises a carburetor having an atmospheric air inlet and a venturi adapted for flow therethrough of at least a portion of the air passing through said inlet to said carburetor, and said conduit from the fuel tank is adapted to convey the vapors therefrom to the low-pressure zone of said venturi.

3. The combination of claim 2 wherein said conduit contains a flow control valve which permits substantial fuel vapor flow only when said internal combustion engine is operating at a speed such that engine performance is not adversely affected by the presence of said fuel vapors in the carburetor air.

4. The of claim 1 wherein said impervious flexible medium comprises a diaphragm positioned generally horizontally across said rigid shell of the tank dividing the tank into an upper air section and a lower fuel section.

5. The combination of claim 1 wherein said impervious flexible medium comprises a polymeric collapsible container within said shell, said container having openings only for filling with liquid fuel, withdrawing liquid fuel for use in said internal combustion engine and for passing vapors from above said liquid fuel to said conduit to the air induction means.

6. The combination of claim 5 wherein said conduit includes a liquid float check valve to prevent the passage of liquid from said collapsible container to said air induction means.